March 13, 1928.
W. GEIST
1,662,511
POWER TRANSMITTING MECHANISM
Filed Jan. 24, 1925
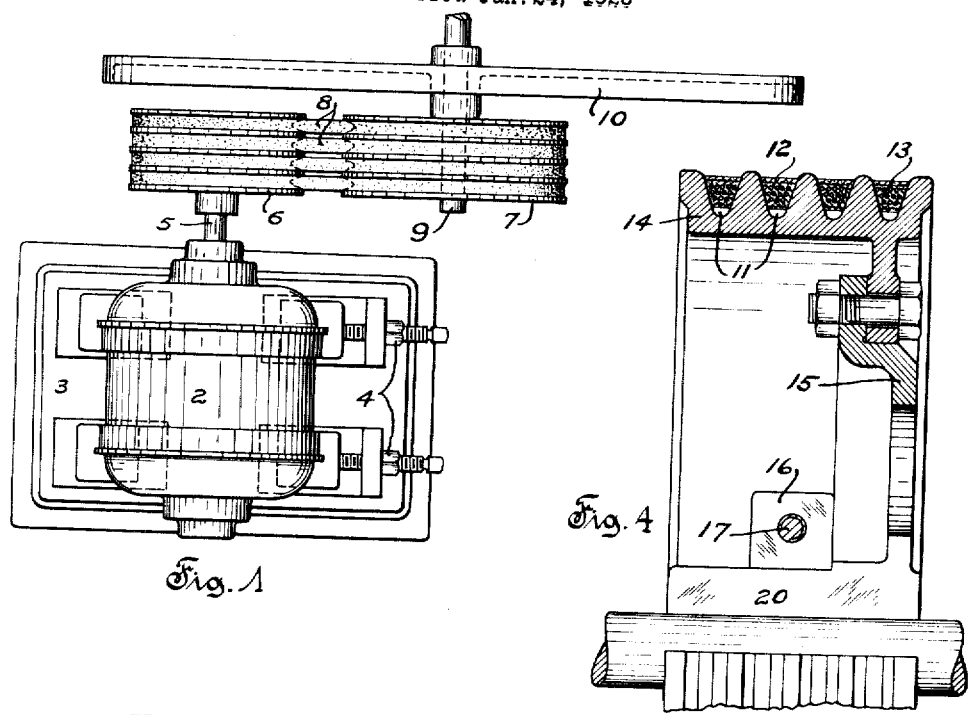
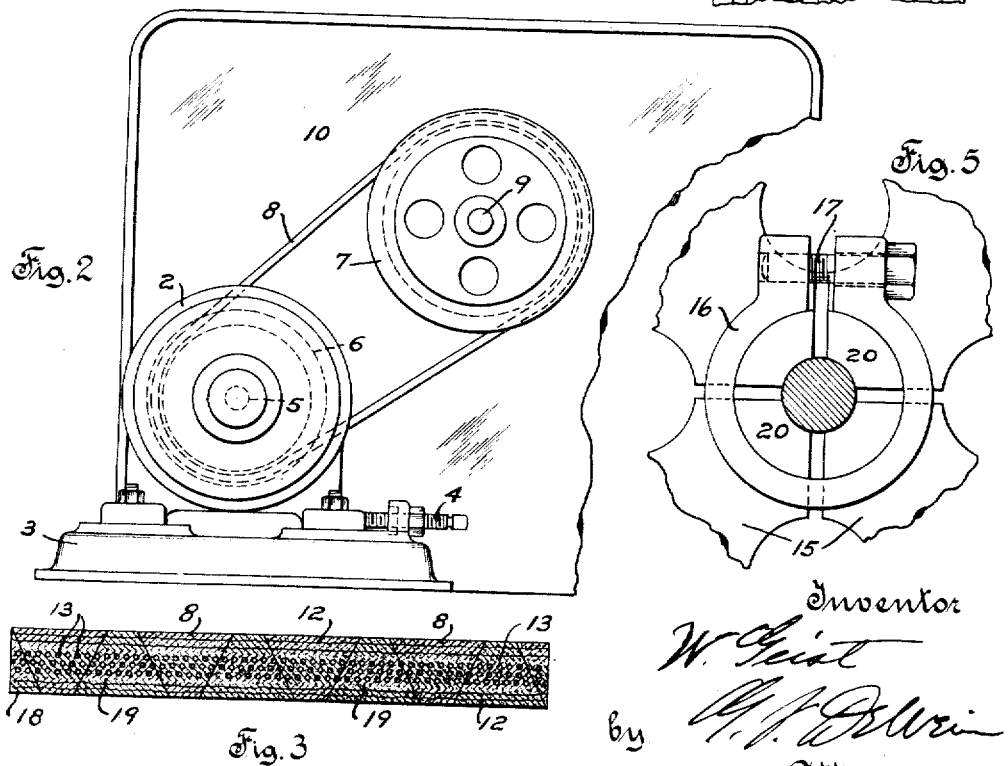

Patented Mar. 13, 1928.

1,662,511

UNITED STATES PATENT OFFICE.

WALTER GEIST, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

POWER-TRANSMITTING MECHANISM.

Application filed January 24, 1925. Serial No. 4,412.

This invention relates in general to improvements in the art of transmitting power, and has been applied more specifically to an improved drive for transmitting rotary motion from one member to another located closely adjacent to the driving member, as, for instance in a textile machine with individual motor drive. The invention is not, however, limited to a drive with "close centers," that is, it also applies to drives in which the centers are spaced apart a relatively greater distance.

An object of the invention is to provide an improved drive which is simple in construction and efficient in operation.

It is common practice in the American textile industry, to utilize chain and gear drives for operating such machines, because of the supposed reliability thereof in the limited space available, the driving motor being located directly at the end of the frame of the machine and closely adjacent to the operating shaft thereof. These drive chains or gears besides being expensive to install and maintain, effect a positive drive at all times between the driving and driven members and require considerable time for replacement and repair. A positive drive is also objectionable when operating textile machines, because any sudden variation in speed of the motor during starting or running is instantaneously transferred to the mechanism and frequently ruptures the frail threads of the material operated upon. While the so-called "silent" chain and gear drives are relatively silent at times, they become extremely noisy if not properly lubricated and after they become worn.

While attempts have heretofore been made to obviate the difficulties encountered with chain and gear drives, by utilizing plural groove sheaves in a rope drive comprising a single relatively thin continuous rope and including one or more idler or tension sheaves, these drives are relatively costly due to the initial cost of the rope and the extremely high cost of the carefully constructed splice which is necessary in driving ropes of this kind. The single continuous rope drive is also objectionable because the entire rope must be replaced in case excessive local wear occurs at any one portion thereof. If a single continuous rope is not properly guided it wears quickly and thus requires accurate and complicated guide mechanism in order to insure even a reasonable life for the rope. The necessary offsetting of the sheaves in such a drive makes it practically impossible to properly guide the single rope in plural groove sheaves. The tension mechanism necessary is also relatively complicated and compels a wide range of adjustment thereby making the mechanism undesirably cumbersome and expensive.

The British system of multiple rope drive with plural groove sheaves necessitates "long centers" between sheave shafts so as to have long stretches of rope between sheaves in order to attain the proper friction grip of the rope on the sheaves. The teachings in rope drives have instructed that it is not feasible to operate a rope drive on shorter centers than fourteen times the diameter of the smaller sheave.

The present invention contemplates provision of improved power transmitting mechanism and while not limited to "short center" drives, has been especially applied to textile machines with "short centers" between the driving and driven sheaves. In the improved drive, several independent endless elements coact with grooved sheaves, the elements being of trapezoidal cross-section and fitting closely in wedge fashion the sides of the grooves. By utilizing a plurality of driving elements, each element may have a relatively small cross-section thus permitting the use of sheaves having minimum diameter and further permitting disposition of the driving and driven members closely adjacent to each other. The tension of all of the plurality of endless elements may be effectively and simultaneously varied by merely shifting the motor slightly relatively to the driven member. The endless driving elements are preferably of special construction whereby uniformity and identity of structure is assured. Each individual element of the plural drive may be replaced independently of the others, in case said element is defective and wears more rapidly than the others. By utilizing a plurality of endless driving elements, one or more elements may also be added or subtracted in order to accommodate variable transmission requirements. These and other objects and advantages attainable with the present improvement, will be apparent in the course of following description.

By the term "sheave" is meant one or more pulley wheels having a common axis and providing a plurality of grooves. By the term "belt" is meant any continuous strap or band for transmitting power from one wheel to another by friction, regardless of the presence of a splice in the belt. By continuous side driving surface as applied to the belt, is meant such continuity of a portion of each side driving surface, as would include at least substantially the arc of contact with a sheave. By differential driving is meant the driving resulting in unequal torque produced by one or more belts of a multiple belt drive, as compared to that produced by others. By the term "elastic" is meant that characteristic of the belts whereby they spontaneously return to or toward their former size or shape after having been compressed, expanded, or distorted in any way.

A clear conception of an embodiment of the invention and of the operation of devices constructed in accordance therewith, may be had by referring to the drawing accompanying and forming a part of this specification in which like reference characters designate the same or similar parts in the various views.

Fig. 1 is a top view of an improved power transmission mechanism operable by an electric motor.

Fig. 2 is an end view of the improved power transmission mechanism.

Fig. 3 is an enlarged transverse section through a piece of stock showing the method of constructing the driving elements.

Fig. 4 is an enlarged fragmentary central vertical section through one of the driving sheaves and the endless elements associated therewith.

Fig. 5 is an enlarged fragmentary end view of the hub of one of the driving sheaves.

The improved power transmission mechanism specifically illustrated comprises in general a driving member or shaft 5; a driven member or shaft 9; a grooved sheave 6 secured to the driving member 5; a grooved sheave 7 secured to the driven member 9; and a plurality of independent endless transmission elements or belts 8 coacting with the grooves of the sheaves 6, 7. The driving member or shaft 5 is capable of being rotated by means of a prime mover, such as an electric motor 2, which is mounted upon a base 3 and is adjustable thereon by means of mechanism 4. The driven member or shaft 9 is rotatably mounted in the frame 10 of a spinning machine or the like, and is drivingly connected to any mechanism requiring rotary motion.

The sheaves 6, 7 may be constructed as shown in detail in Figs. 4 and 5. Each sheave comprises a continuous annular rim 14 having a plurality of parallel annular V-shaped grooves 11 in the periphery thereof, these grooves preferably having included angles between the side driving surfaces thereof, as shown, that is, approximately 40 degrees. The rim 14 is bolted to a spider 15 having a plurality of hub sections 20 formed integral therewith. The hub sections 20 are internally bored to coact with the shaft 5, 9 and are externally embraced by a clamp 16 which is adapted to be contracted by means of one or more clamp screws 17, to firmly lock the hub sections 20 in engagement with the shaft.

The endless elements 8 are preferably of special construction. All of the elements 8 constituting a drive are preferably formed from a single annular piece of stock which is built up of fabric sheets 12 and cords 13 embedded in soft rubber thus making the elements laterally compressible and resilient. After the piece of stock 18 has been formed as illustrated in Fig. 3, it may be placed upon a drum and cut as indicated, along the lines extending transversely thereacross, thus forming two sets of elements 8, 19. It will be noted that by thus forming the endless elements, all of the elements 8 constituting one set will have identical characteristics and structure, and all of the elements 19 constituting the other set will likewise have identical characteristics and structure. By utilizing two or more of the elements 8 of one set in a common drive identity of the driving elements will be assured. Likewise by utilizing two or more of the elements 19 in a common drive, identity of the elements is assured. The elements 8, 19 should however be formed to coact with the side surfaces only of the grooves 11 in order to insure proper gripping by wedging action. While the identity of belt or driving element structure, desirable in order to insure smoother operation, may be secured in the manner just described, such identity may obviously be secured by paying particular attention to this feature when manufacturing belts by other processes for use in drives the subject of this invention. It should be understood, however, that while identity of the belts is desirable, it is not essential.

During normal operation of the power transmitting mechanism the motor 2 is operating to rotate the driving member or shaft 5 and the sheave 6 associated therewith. The rotary motion is transmitted from the sheave 6 through the belts or endless elements 8 to the sheave 7 and from the sheave 7 to the driven member or shaft 9 from whence the rotary motion is transmitted to the mechanism requiring rotary motion. Due to the relatively elastic construction of the endless elements 8, any shock or sudden variation in speed of the motor will be materially absorbed before reaching the driven sheave 7 thus insuring smooth operation of the driven machine. This elasticity of the belts or elements 8 as disclosed, and their use in multiple, eliminates objectionable differential driving, as has been demonstrated in the actual extensive practice of the invention. The elasticity of the belts provides relative yieldability between them and the sheaves, this being an important factor in overcoming differential driving. If, for any reason it is desirable to vary the tension of the endless elements 8, it is only necessary to adjust the motor 2 upon the base 3 with the aid of the adjusting mechanism 4, thus simultaneously adjusting the tension of all of the elements 8.

It will be obvious that by forming the elements 8 of V-shape or trapezoidal cross-section and permitting these elements to have surface coaction with the sides of the V-grooves 11 as clearly shown in Fig. 4, slippage is entirely avoided. It will also be observed that the surface coaction between the sides of the V-belts and the grooves, affords a continuous side driving coaction, which, as the belt travels from the tangent into a groove of a sheave, permits it to enter with a minimum of friction and wear, and, as the tangent changes into the curve of the sheave, causes the belt to compress, and to thus expand laterally in the groove, thereby increasing the friction and bringing the belt into high tractive contact with the side surfaces of the groove; and subsequently, as the belt approaches the tangent on the leaving side of the groove, changing its curve from that of the sheave to the tangent, this surface coaction permits the compression and friction to be gradually relieved and allows the belt to pass from the groove with a minimum pressure thereagainst, and with a corresponding minimum of friction and wear. By utilizing endless elements 8, 19 of relatively small cross-section, sheaves 6, 7 of comparatively small diameter may be utilized and the member 2 may be located closely adjacent to the driven shaft 9 of the driven machine. The entire mechanism is obviously extremely simple and compact and the endless elements 8, 19 may be readily replaced either individually or collectively. By forming the endless elements 8, 19 as illustrated in Fig. 3, identity in construction of these elements is insured and a minimum amount of the stock is wasted. The fabric 12 and the cords 13 embedded within the rubber constituting the remainder of the body of each element, insure long life of the transmission mechanism.

It should be understood that it is not desired to limit the invention to the exact details of construction and operation herein shown and described for various modifications within the scope of the claims may occur to persons skilled in the art.

It is claimed and desired to secure by Letters Patent:

1. In combination, driving and driven sheaves rotatable about substantially parallel axes and providing a plurality of sets of alined V-grooves, and a plurality of independent V-belts each having opposite continuous side driving surface portions cooperable with the side surfaces of a set of said grooves, said grooves and said belts being relatively elastic and resilient to automatically establish equal driving ratios for all of said belts during rotation of said sheaves.

2. In combination, driving and driven sheaves rotatable about substantially parallel axes and providing a plurality of sets of alined V-grooves, and a plurality of independent V-belts each having opposite continuous side driving surface portions cooperable with the side surfaces of a set of said grooves, said grooves and said belts being relatively elastic to permit the belts to automatically produce substantially equal driving torque.

3. In combination, driving and driven sheaves rotatable about substantially parallel axes and providing a plurality of sets of alined V-grooves, and a plurality of independent V-belts each having opposite continuous side driving surface portions alone cooperable with surfaces of a set of said grooves, said belts being elastic to permit same to automatically produce substantially equal driving torque.

4. In combination, driving and driven sheaves rotatable about substantially parallel axes and providing a plurality of sets of alined V-grooves, the grooves of each sheave having equal pitch diameters, and a plurality of independent V-belts each having opposite continuous side driving surface portions alone cooperable with surfaces of a set of said grooves, said belts being elastic to automatically assume at all the grooves of each sheave substantially equal driving radii during rotation of said sheaves.

5. In combination, driving and driven sheaves rotatable about substantially parallel axes and providing a plurality of sets of alined V-grooves the included angle between the sides of which is approximately 40 degrees, and a plurality of independent V-belts each having opposite continuous side driving surface portions the included angle between which is likewise approximately 40 degrees and which are cooperable with the side surfaces of a set of said grooves, said grooves and said belts being relatively elastic to automatically establish equal driving ratios for all of said belts during rotation of said sheaves.

6. In combination, driving and driven sheaves rotatable about substantially parallel axes and providing a plurality of sets of alined V-grooves the included angle between the sides of which is approximately 40 degrees, the grooves of each sheave having equal pitch diameters, and a plurality of independent V-belts each having opposite continuous side driving surface portions the included angle between which is likewise approximately 40 degrees and which are alone cooperable the side with the side surfaces of a set of said grooves, said belts being elastic and free to automatically assume at all the grooves of each sheave substantially equal driving radii during rotation of said sheaves.

7. In combination, driving and driven sheaves rotatable about substantially parallel axes and providing at least three sets of alined V-grooves, and a plurality of independent V-belts each having opposite continuous side driving surface portions cooperable with the side surfaces of a set of said grooves, said grooves and said belts being relatively elastic to permit said belts to automatically assume predetermined driving radii within the corresponding grooves of said sets during rotation of said sheaves.

8. In combination, driving and driven sheaves rotatable about substantially parallel closely adjacent axes and providing at least three sets of alined V-grooves, the grooves of each sheave having equal pitch diameters, and a plurality of independent laterally and longitudinally elastic V-belts each having opposite continuous side driving surface portions alone cooperable with surfaces of a set of said grooves, the included angle between the side portions of said belts and grooves being approximately 40 degrees and said grooves and belts being relatively cooperable to cause the belts by virtue of their elasticity to automatically assume at all the grooves of each sheave substantially equal driving radii during rotation of said sheaves.

9. In combination, driving and driven members rotatable about substantially parallel axes, at least one of said members having a plurality of peripheral V-grooves, and a plurality of independent V-belts each having opposite continuous side driving surface portions cooperable with the side surfaces of said grooves, said grooves and said belts being relatively elastic to permit the belts to automatically produce substantially equal driving torque.

In testimony whereof, the signautre of the inventor is affixed hereto.

WALTER GEIST.

allel axes and providing a plurality of sets of alined V-grooves the included angle between the sides of which is approximately 40 degrees, the grooves of each sheave having equal pitch diameters, and a plurality of independent V-belts each having opposite continuous side driving surface portions the included angle between which is likewise approximately 40 degrees and which are alone cooperable the side with the side surfaces of a set of said grooves, said belts being elastic and free to automatically assume at all the grooves of each sheave substantially equal driving radii during rotation of said sheaves.

7. In combination, driving and driven sheaves rotatable about substantially parallel axes and providing at least three sets of alined V-grooves, and a plurality of independent V-belts each having opposite continuous side driving surface portions cooperable with the side surfaces of a set of said grooves, said grooves and said belts being relatively elastic to permit said belts to automatically assume predetermined driving radii within the corresponding grooves of said sets during rotation of said sheaves.

8. In combination, driving and driven sheaves rotatable about substantially parallel closely adjacent axes and providing at least three sets of alined V-grooves, the grooves of each sheave having equal pitch diameters, and a plurality of independent laterally and longitudinally elastic V-belts each having opposite continuous side driving surface portions alone cooperable with surfaces of a set of said grooves, the included angle between the side portions of said belts and grooves being approximately 40 degrees and said grooves and belts being relatively cooperable to cause the belts by virtue of their elasticity to automatically assume at all the grooves of each sheave substantially equal driving radii during rotation of said sheaves.

9. In combination, driving and driven members rotatable about substantially parallel axes, at least one of said members having a plurality of peripheral V-grooves, and a plurality of independent V-belts each having opposite continuous side driving surface portions cooperable with the side surfaces of said grooves, said grooves and said belts being relatively elastic to permit the belts to automatically produce substantially equal driving torque.

In testimony whereof, the signautre of the inventor is affixed hereto.

WALTER GEIST.

CERTIFICATE OF CORRECTION.

Patent No. 1,662,511.   Granted March 13, 1928, to

WALTER GEIST.

It is hereby certified that error appears in the printed specification of the above numbered patent requiring correction as follows: Page 4, line 10, claim 6, strike out the words "the side" both occurrences; same page, line 57, for the misspelled word "signautre" read "signature"; and that the said Letters Patent should be read with these corrections therein that the same may conform to the record of the case in the Patent Office.

Signed and sealed this 10th day of April, A. D. 1928.

(Seal)

M. J. Moore,
Acting Commissioner of Patents.

CERTIFICATE OF CORRECTION.

Patent No. 1,662,511.   Granted March 13, 1928, to

WALTER GEIST.

It is hereby certified that error appears in the printed specification of the above numbered patent requiring correction as follows: Page 4, line 10, claim 6, strike out the words "the side" both occurrences; same page, line 57, for the misspelled word "signautre" read "signature"; and that the said Letters Patent should be read with these corrections therein that the same may conform to the record of the case in the Patent Office.

Signed and sealed this 10th day of April, A. D. 1928.

(Seal)

M. J. Moore,
Acting Commissioner of Patents.